United States Patent
Ratti

(10) Patent No.: US 10,793,412 B2
(45) Date of Patent: Oct. 6, 2020

(54) INTERACTIVE ROBOTIC STATION FOR BEVERAGE, IN PARTICULAR COCKTAIL, PREPARATION AND DISPENSING

(71) Applicant: Carlo Filippo Ratti, Turin (IT)

(72) Inventor: Carlo Filippo Ratti, Turin (IT)

(*) Notice: Subject to any disclaimer, the term of this patent is extended or adjusted under 35 U.S.C. 154(b) by 742 days.

(21) Appl. No.: 14/783,379

(22) PCT Filed: Apr. 8, 2014

(86) PCT No.: PCT/IB2014/060534
§ 371 (c)(1),
(2) Date: Oct. 8, 2015

(87) PCT Pub. No.: WO2014/167499
PCT Pub. Date: Oct. 16, 2014

(65) Prior Publication Data
US 2016/0052770 A1    Feb. 25, 2016

(30) Foreign Application Priority Data
Apr. 9, 2013  (EP) .................................... 13162973

(51) Int. Cl.
| | |
|---|---|
| *B67D 1/00* | (2006.01) |
| *A47J 43/27* | (2006.01) |
| *B25J 11/00* | (2006.01) |
| *G06Q 20/18* | (2012.01) |
| *G06Q 50/12* | (2012.01) |

(52) U.S. Cl.
CPC ............ *B67D 1/0041* (2013.01); *A47J 43/27* (2013.01); *B25J 11/008* (2013.01); *G06Q 20/18* (2013.01); *G06Q 50/12* (2013.01); *Y10S 901/01* (2013.01); *Y10S 901/27* (2013.01); *Y10S 901/30* (2013.01)

(58) Field of Classification Search
USPC ............. 222/129.1, 129.3, 129.4, 144.5, 52; 99/323.2
See application file for complete search history.

(56) References Cited

U.S. PATENT DOCUMENTS

| | | | |
|---|---|---|---|
| 4,628,974 A | 12/1986 | Meyer | |
| 9,763,536 B1* | 9/2017 | Lefkovitz | ............... A47J 31/44 |
| 2006/0037969 A1* | 2/2006 | Jennings | ............... B25J 9/0084 |
| | | | 222/129.1 |
| 2007/0106422 A1 | 5/2007 | Jennings et al. | |

(Continued)

FOREIGN PATENT DOCUMENTS

DE    19627360    1/1998

OTHER PUBLICATIONS

Corresponding International Search Report and Written Opinion for PCT/IB2014/060534 dated Dec. 5, 2014.

*Primary Examiner* — Oluseye Iwarere
*Assistant Examiner* — Reva R Moore
(74) *Attorney, Agent, or Firm* — The Belles Group, P.C.

(57) ABSTRACT

An interactive robotic station for beverage preparation comprising a user input interface (101), automated ingredient dispensers (41), a robotic station (105) to collect ingredients from the dispenser, mix the ingredients, perform bartending operation, preferably mixing and/or shaking and/or muddling and/or blending and/or straining, pour the beverage in an open top container (5) and provide the container to a user, and a control unit (103) to automatically control the dispensers and the robotic station based on the inputs from the input interface.

20 Claims, 14 Drawing Sheets

(56) References Cited

U.S. PATENT DOCUMENTS

| | | | | |
|---|---|---|---|---|
| 2008/0277424 A1* | 11/2008 | Larimer | ................. | A47J 43/27 |
| | | | | 222/189.07 |
| 2010/0024660 A1* | 2/2010 | Wallace | ............. | B01F 3/04794 |
| | | | | 99/323.2 |
| 2014/0067122 A1* | 3/2014 | Kihara | .................. | B25J 9/0096 |
| | | | | 700/257 |
| 2015/0290795 A1* | 10/2015 | Oleynik | ................ | G05B 19/42 |
| | | | | 700/257 |

* cited by examiner

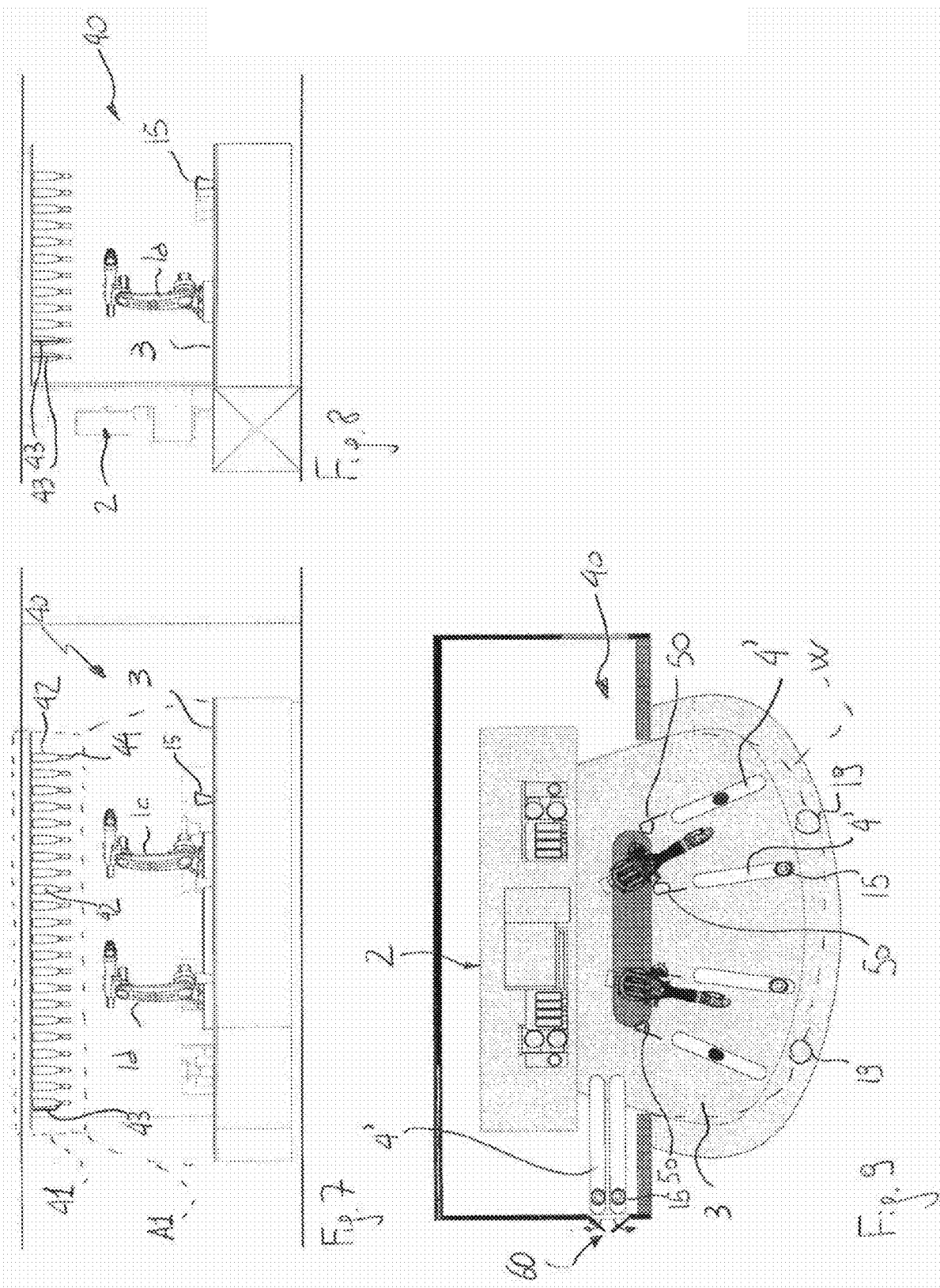

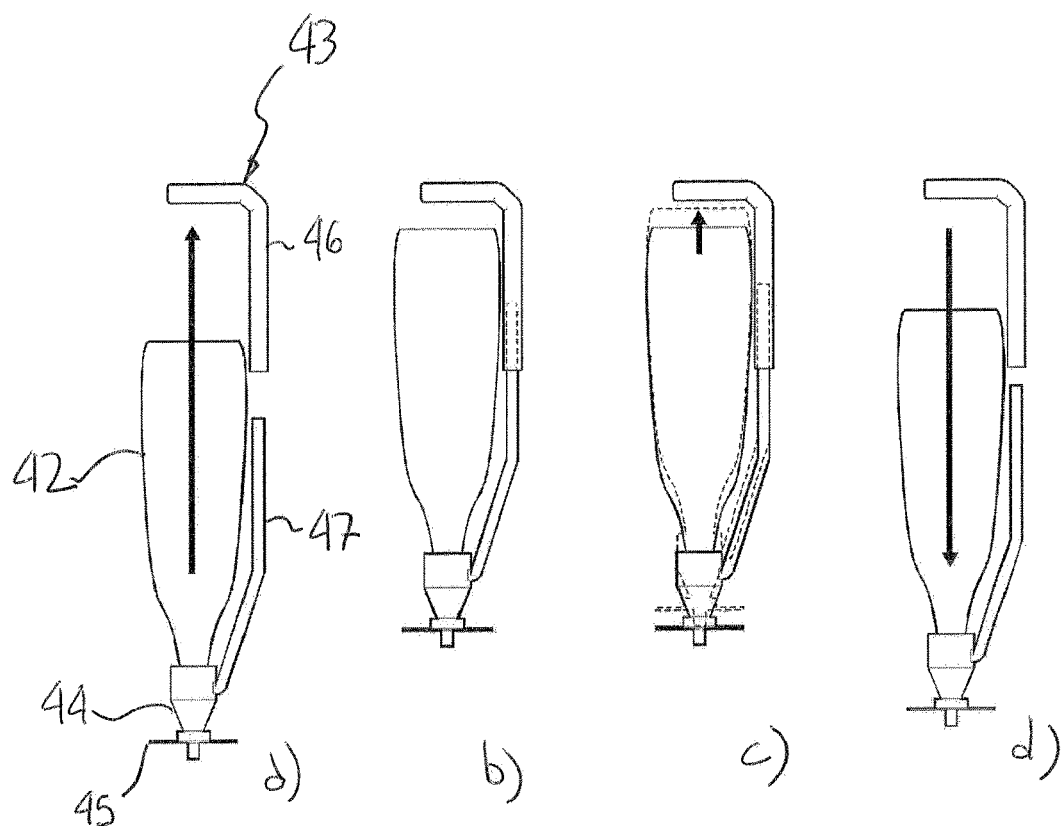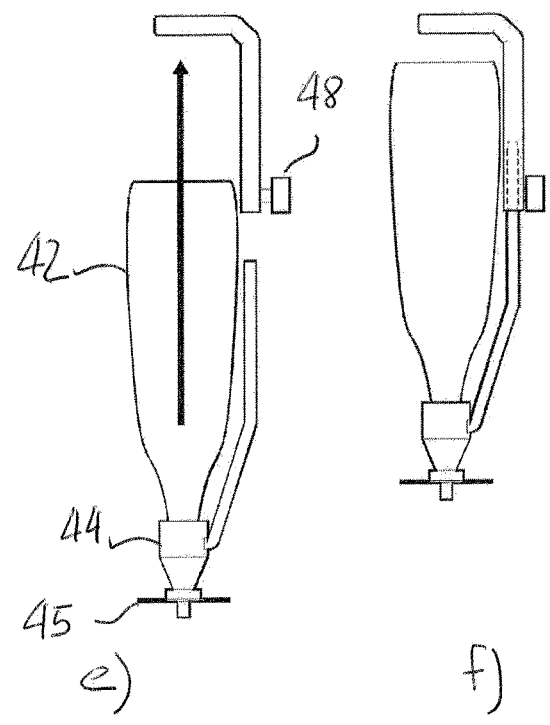
Fig. 10

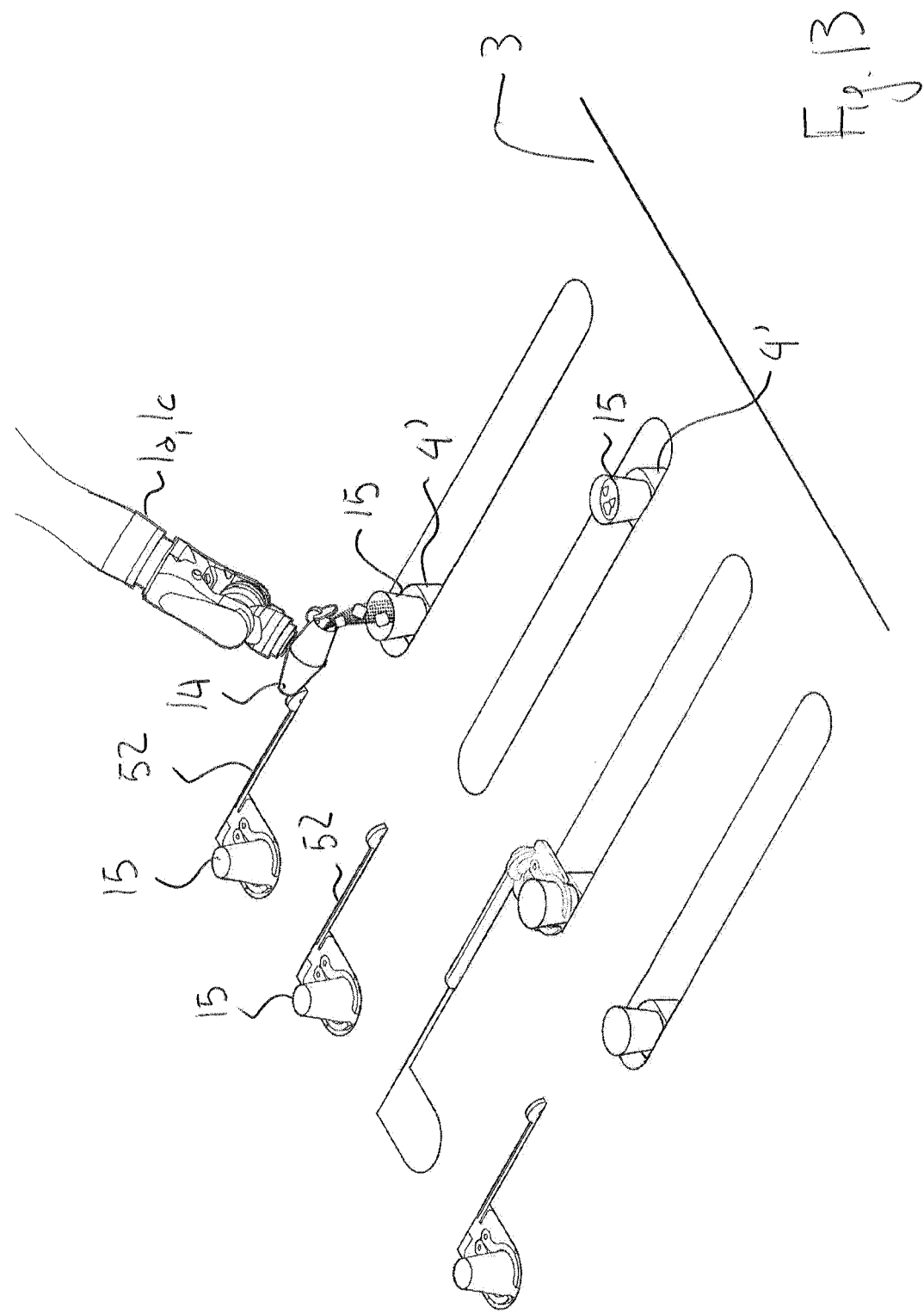

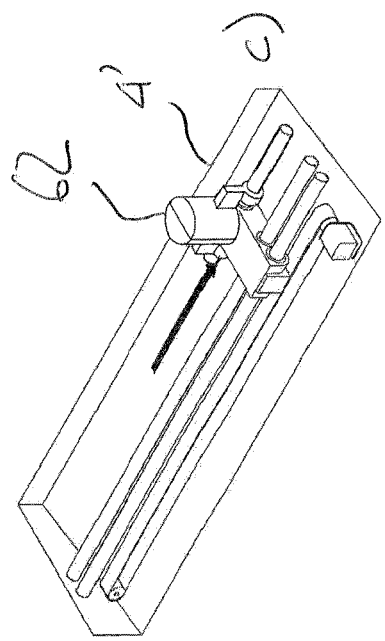
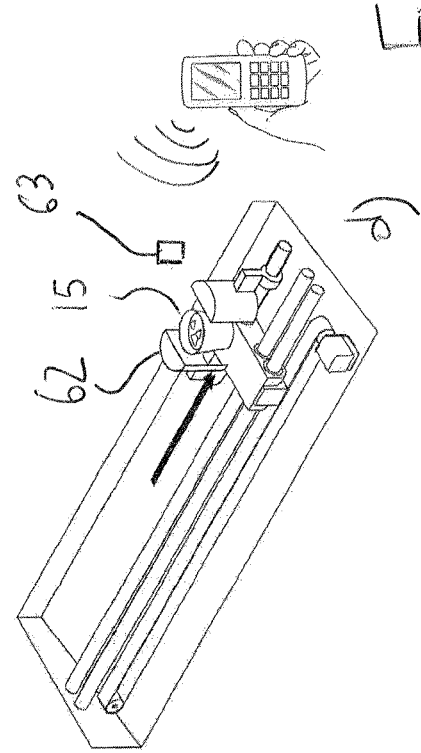
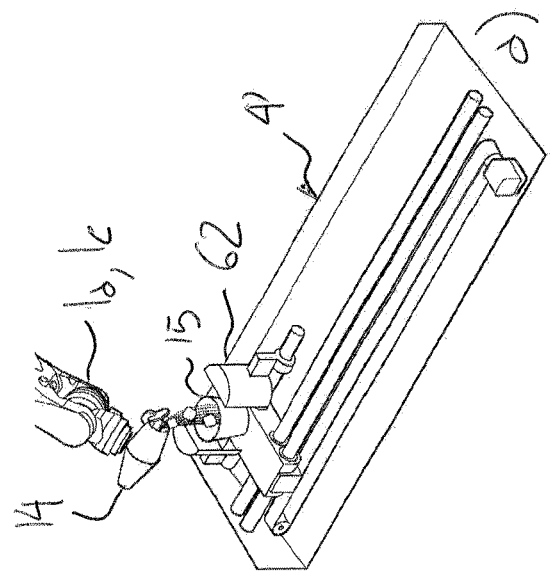
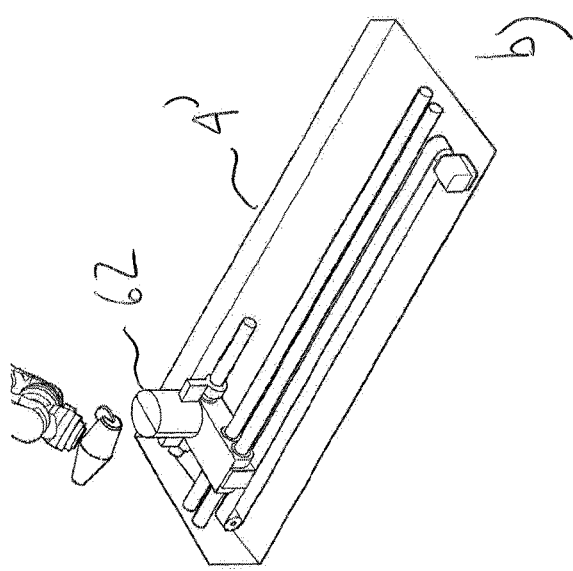
Fig. 4

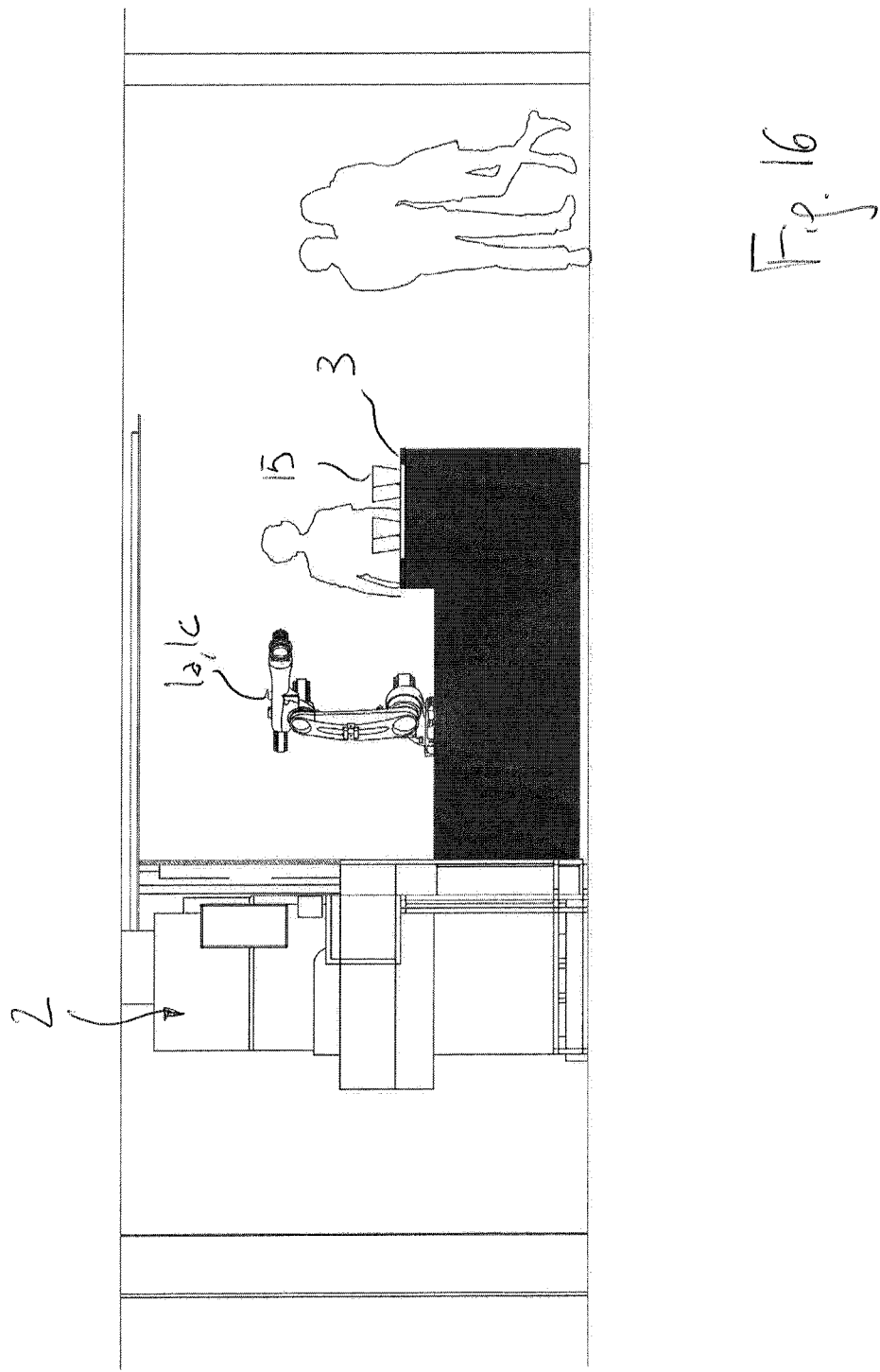

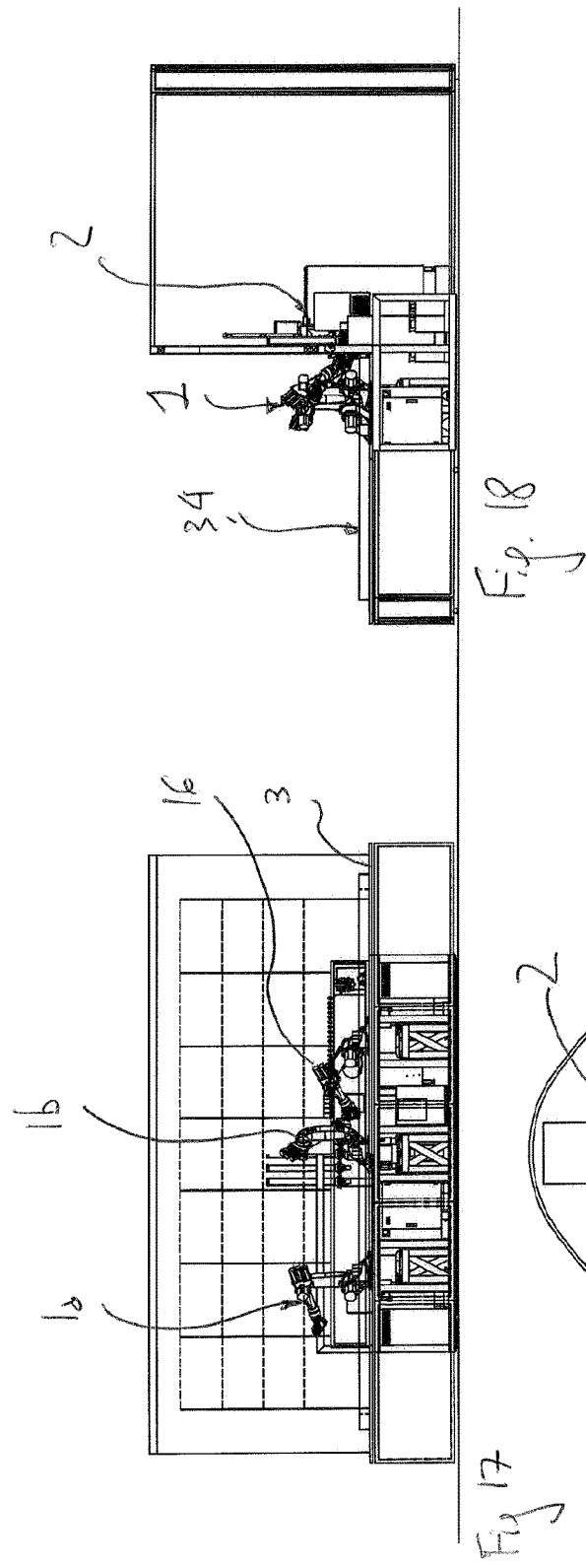
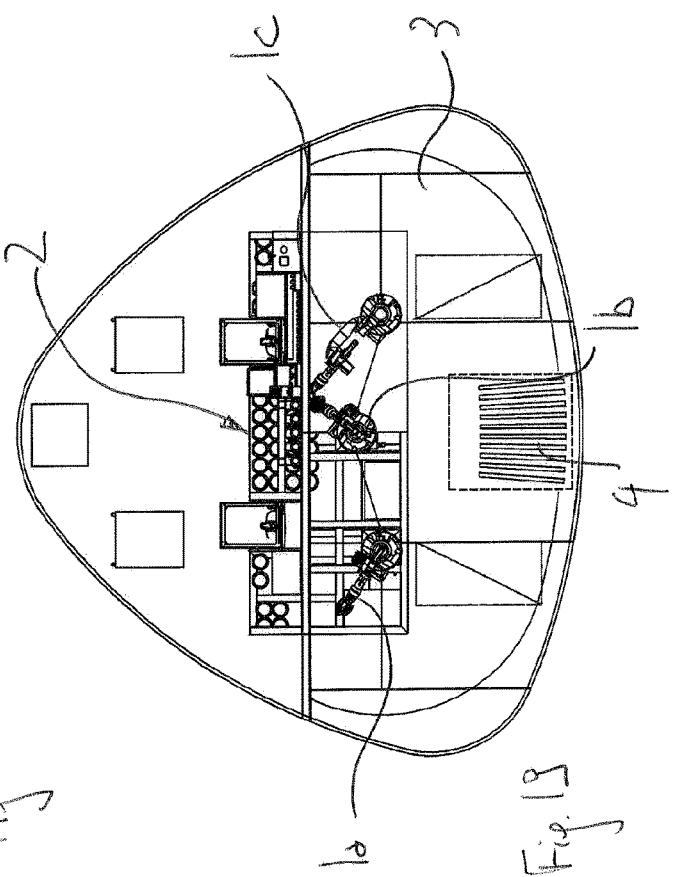

INTERACTIVE ROBOTIC STATION FOR BEVERAGE, IN PARTICULAR COCKTAIL, PREPARATION AND DISPENSING

PRIORITY

Priority is claimed as a national stage application, under 35 U.S.C. § 371, to international patent application No. PCT/IB2014/060534, filed Apr. 8, 2014, which claims priority to European patent application 13162973.5, filed Apr. 9, 2013. The disclosures of the aforementioned priority applications are incorporated herein by reference in their entirety.

BACKGROUND OF THE INVENTION

The proposed invention is in the technical field of large-scale industrial robots.

More specifically, the present invention is in the technical field of production lines actuated through large-scale industrial robots.

More specifically, the present invention is in the technical field of automation and use of robots, preferably but not exclusively large-scale industrial robots, in daily tasks.

More specifically, the proposed invention is in the technical field of automated beverage production, in particular cocktail production lines actuated by a user-generated input through large-scale industrial robots.

LIST OF FIGURES

FIGS. 7 to 9 are a front, lateral and plan view respectively of a second embodiment of a robotic station according to the present invention;

FIG. 10 is a sequence of schematic views of a detail of the robotic station of FIGS. 7 to 9;

FIG. 13 shows a sequence of perspective views to explain the functioning of the sub-unit according to FIG. 12;

FIG. 14 shows a sequence of perspective views to explain the functioning of a further sub-unit of a robotic station according to the present invention;

FIGS. 15 and 16 are a front and lateral view respectively of a robotic station according to a fourth embodiment of the present invention;

FIGS. 17 to 19 are a front, lateral and plan view respectively of a fifth embodiment of a robotic station according to the present invention

SUMMARY OF THE INVENTION

Figure 1:
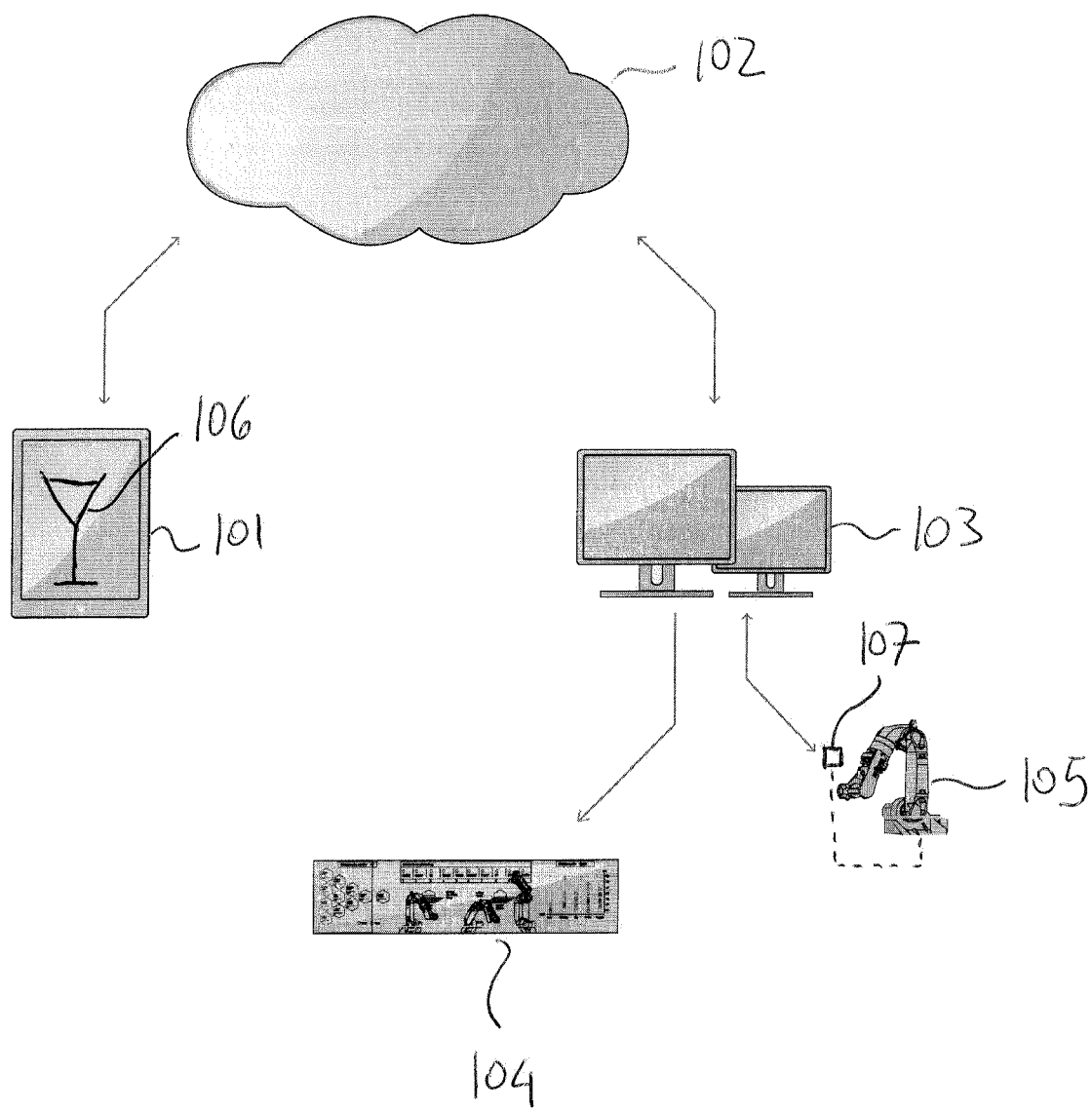
FIG. 1 is a schematic view of a hardware/software platform for preparation of beverages according to the present invention.
Figure 2:
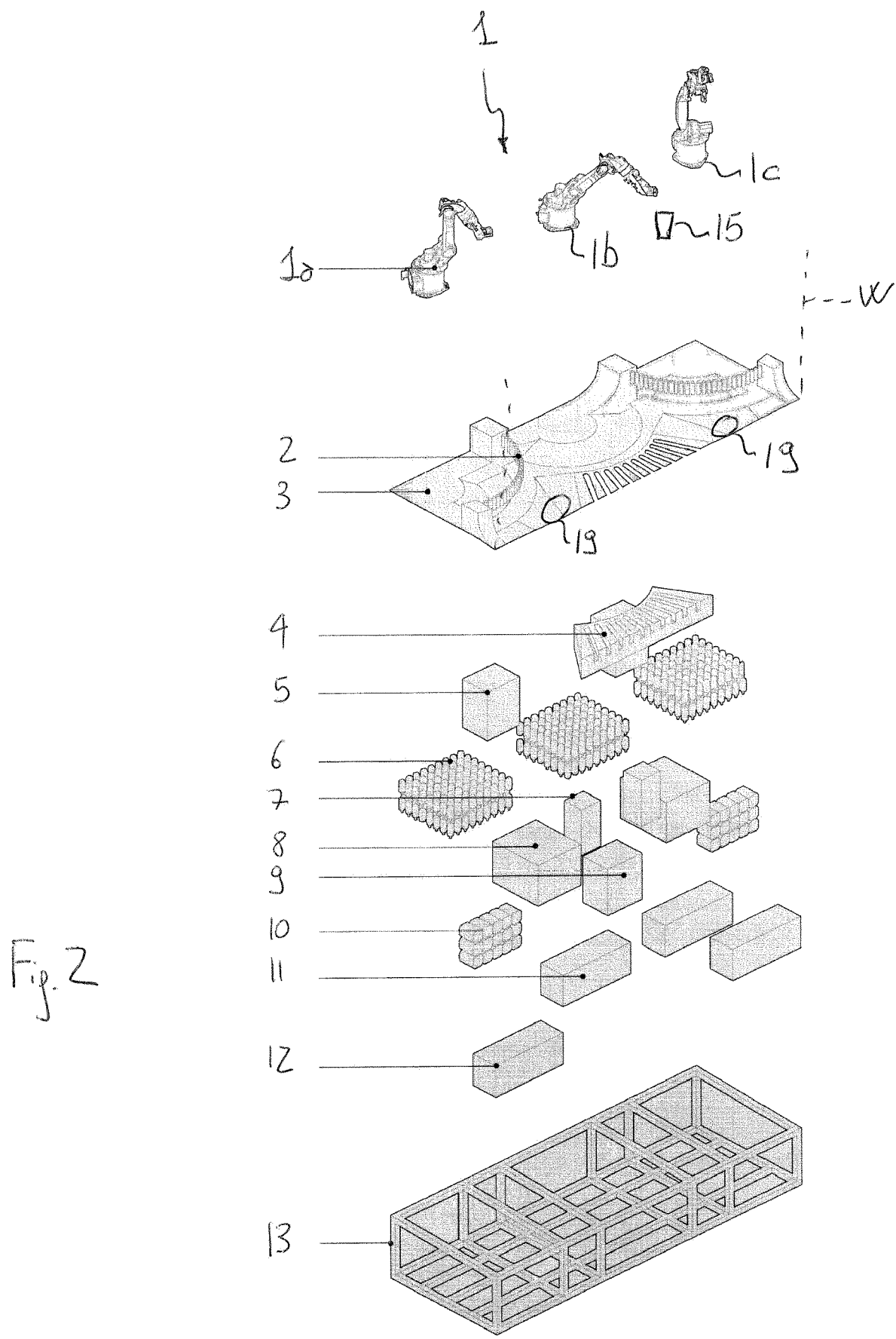
FIG. 2 is a schematic exploded view of a first embodiment of a robotic station for the platform of FIG. 1.

The proposed invention is an automated beverage, in particular cocktail production line or preparation station actuated by a user-generated input through large-scale industrial robots.

The preparation station comprises a user input interface, a robotic station to collect ingredients from the dispenser on the basis of the order, mix the ingredients and pour the beverage in an open top container, and a control unit to automatically control the robotic station based on the inputs from the web interface to prepare the beverage.

Preferably, the preparation station comprises stored beverage recipes created by associated users, each cocktail recipe being defined by a set of instructions to be carried out by the robotic cocktail station and/or a list of ingredients so that a user creates a list of ingredients and relative quantities.

Preferably, the preparation station comprises automated beverage ingredient dispensers controlled by the control unit and the robotic station is such to mix the ingredients.

Furthermore, the preparation station performs bartending operations, preferably mixing and/or shaking and/or muddling and/or blending and/or straining and shows on a display information about the beverage preparation process.

Preferably, the preparation station comprises stored beverage recipes created by an associated user, each cocktail recipe being defined by a set of instructions to be carried out by the robotic station and/or a list of ingredients from which the user selects a sub-list of ingredients and relative quantities.

Preferably, the preparation station comprises automated beverage ingredient dispensers controlled by a control unit and the robotic station is such to mix the ingredients collected from the automated dispensers.

Preferably, the preparation station comprises a display which displays at least one of the following: queuing process of users and/or beverage order; beverage preparation process representation including wait time; statistics on the ordered beverages.

Preferably, the preparation station comprises a structural barrier to avoid injuries of a user. In particular, such structural barrier comprises the counter and a conveyor embedded in the counter having a loading station where a beverage cup rests filled by a beverage prepared by the robotic arm and a pick-up station where a user receives the cocktail cup.

The automated beverage, in particular cocktail, production line or preparation station comprises or is composed of a user interface software, preferably a web and/or smartphone application that runs on a portable device 101, such as a tablet or other or other personal intelligent mobile device, connected to the internet, with the following functionalities:

a. Allow users registering and inserting personal data;
b. Allow users choosing a preferred drink 106 to be prepared, i.e. a user can input a personal recipe with ingredients and relative quantities;
c. Show users data and ingredients used to prepare the preferred drink 106;
d. Show users automated machinery status and system functioning.

The user interface frontend software is preferably a web application, which allows connection to every portable device supporting internet accessibility, without the need of downloading executable software on the user's personal device. The application runs specifically on any Internet browser application already present on the portable device. The user interface is preferably designed accordingly to all possible display sizes for portable devices. According to a further embodiment of the present invention, a first user can store a preferred recipe of the drink 106 so that such recipe can be searched or browsed by other users.

Furthermore, in case a second user selects the above preferred recipe by the first user and introduces some changes, i.e. adding or removing one or more ingredients and/or changing the quantities, the software notifies the first user that his/her recipe was modified. The notifications and/or the users associated to such notifications are stored and considered by a rating algorithm that monitor the recipes managed by the hardware/software order platform comprising the production line and the user interface cited above. For example if a recipe is modified by many different users the relative rating is higher than a recipe that is modified only once and/or is modified many times by a limited number of users.

In alternative or in combination, the rating of a recipe depends on the number of user that chose the recipe and/or on a rating scale according to which each user can rate the selected recipe. In alternative or in combination it is also possible that the ranking is comparative so that, when a recipe is modified, users can rate the modified recipe to be better, worse or equal the parent recipe.

The automated line also comprises a backend software, preferably a Java Servlet that updates and manages the storage of all data received from the web application, an automated controller 107, and a visualization components 104. Data for the system includes the current state of the system itself, user information, order information, ingredient information, drink recipes, statistics and payment. All data are stored in a structured database (preferably a Redis database). The database is continually updated through the input coming from the users through the web application at each stage of the user experience. These input include in any combination user registration, user login confirmation, user information updates, ingredient retrieval, one between recipe creation or recipe retrieval, order placement, and order analytics. All communication between the backend and web application is facilitated through JSON objects. Any Redis information that is needed by the industrial robots controller is then read from Redis database and inserted into a local database (preferably a MySQL database) using a Python bridge that monitors all Redis activity.

This procedure is designed in order to:

Collect user's input onto the user interface frontend software, allowing people to communicate to the automated machineries 105, which will be described in greater detail below, their selection of base ingredients for the ordered drinks 106, matching them with personal information of the user stored via the interface software;

Convert user's input to data the automated machineries 105 can directly cope with;

Read the database coming from the machinery and make them readable, including machineries' operations, liquid availability, system status and definition of the trajectories of the robots to prepare the drinks 106. According to a preferred embodiment of the present invention, the robots are controlled according to an optimized trajectory to displace and complete at least ingredients collection, in particular liquid collection, muddling or blending. The optimization algorithm retrieves the spatial x, y, z, positions that the robots shall reach in order to collect ingredients and automatically defines the relevant trajectory, which preferably comprises linear segments, along which the robots shall move according to optimization criteria, for example to minimize the time for collecting ingredients. Robots are also controlled to move according to a predefined and wavy motion for at least one between shaking or stirring. In such a case, the motion is more complex than the simpler displacement to collect ingredients and is predefined when programming so that no optimization is automatically performed by the automated controller. During programming the motion is predefined relating to e.g. amplitude of oscillation, frequency of the oscillation in case the motion is periodic and frequency or amplitude shift in case the motion is more complex than periodic. Preferably, oscillations are around a central spatial point.

The back end is preferably stored into a cloud database 102, which is constantly replicated in a database on a local server 103, that allows the continuous working of the automated machinery 105 during occasional lack of internet connections.

The automated line also comprises the automated machinery. The automated machinery 105 is composed by liquid-solid-granular dispensers 2, actuated by the backend software, that dispense base ingredients according to their nature and user's instructions collected via the interface software, in favour of robotic arms 1, preferably anthropomorphic robotic arms.

Figure 3:
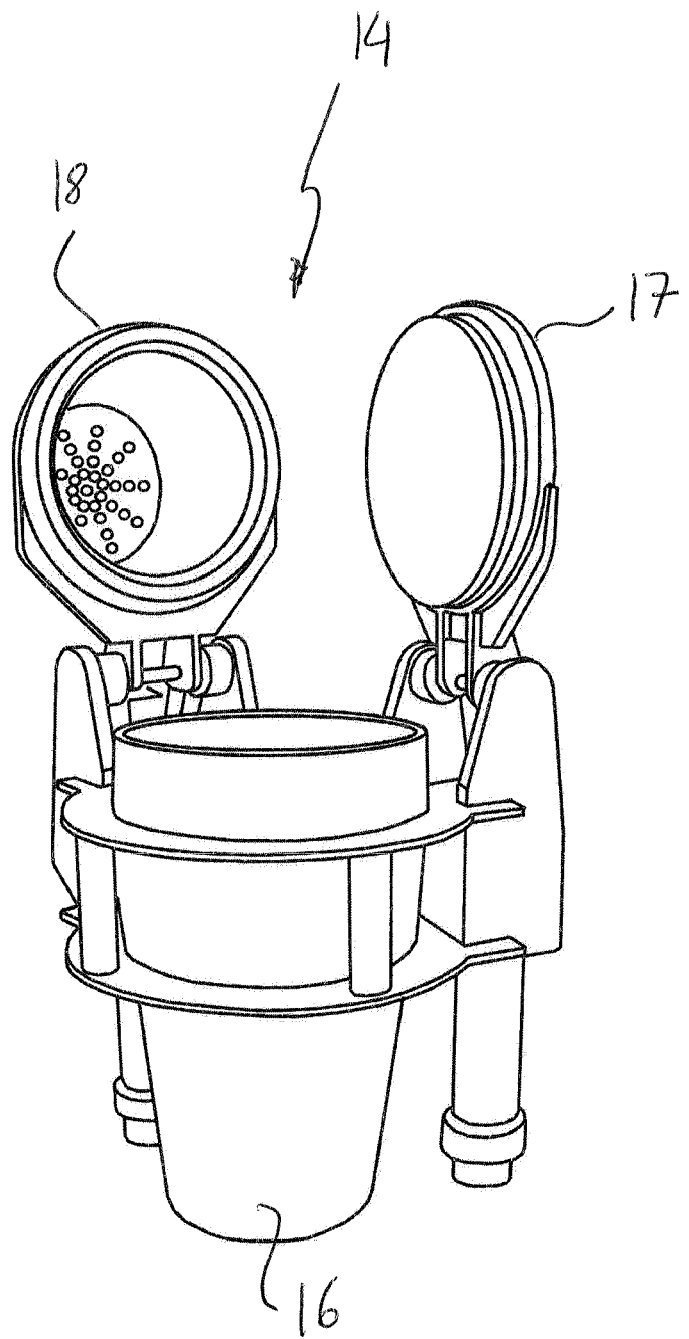
FIG. 3 is a perspective view of a detail of the robotic station of FIG. 2.

The robots 1 have an open top liquid container 14 "end-effector" (FIG. 3) that enables the liquid collections thanks to the movement of the robotic arms 1. Robots 1 move to align vertically with the dispensers 2 activated by the backend software in order to collect dispensed ingredients. In particular, dispensers are controlled by the backend software to dose each ingredients. In particular an appropriate flow control is provided to dose the liquid ingredients. Preferably the flow control is an open loop control and a duty cycle of a discrete open/closed valve (not shown) is controlled in order to dose the liquid ingredients. The automated machinery 105 and automated controller 107 is designed in order to:

a. Read data coming from backend and perform specific actions according to the drink 106; such actions do not relate to collection of ingredients and can be of a choreographic type to have the robots 'dancing' according to a predefined wavy motion;

b. Sense or detect its operational status and communicate to the backend software;

c. Prepare the drinks 106 according on instructions by the user.

The proposed invention preferably includes three robotic arms 1a, 1b, 1c.

Preferably one robotic arm 1b, in a middle position between the other two, is to receive disposable open top liquid container, i.e. a plastic cup or glass 15, and make it available to the other two.

Preferably two robotic arms 1a, 1c, at the two sides of the central robotic arm 1b, have the end-effector 14 (FIG. 3) in the shape of a bartender shaker. This end-effector is made of three parts: a bottom 16 that receive ingredients, a mechanically actuated cap 17 that allows waterproof closing, a metallic filter 18 in-between that allows straining the drink 106 during the pouring.

Preferably two robotic arms 1a, 1c, at the two sides of the central robotic arm 1b, have an alternative end-effector in the shape of a bartender shaker, that enables the robotic arms itself to shake the ingredient without dripping.

Preferably two robotic arms 1a, 1c, at the two sides of the central robotic arm 1b, have an alternative end-effector in the shape of a bartender shaker, that enables the robotic arms itself to muddle the ingredient without dripping.

Preferably the two robotic arms 1a, 1c, at the two sides of the central robotic arm 1b, move to align vertically with each dispenser 2 required by the mix of ingredients for preparing the cocktail 106.

Preferably the two side robotic arms 1a, 1c pour the drinks made of the different base ingredients into the open top liquid container 15 provided by the central robotic arm 1b.

The central robotic 1b arm proceeds eventually to lend the open top liquid container to the people who operated the user interface frontend software. Preferably this is obtained by providing the automated line with a counter top and a glass serving conveyor belt 4 where the central robotic arm 1b places the open top liquid container 15 filled with the drink 106.

To provide adequate user safety features, the central robotic arm places the open top liquid container 15 on a belt conveyor 4 top or the like that ultimately carries the drink to the user. In this way the user is always out of any trajectory of the robotic arms (passive safety feature). Belt conveyor 4 is placed below a counter top 2.

Furthermore, 2D laser scanners 19 or the like are provided to delimit a working area W of the robotic arms 1a, 1b, 1c and to stop the robots in case a user or another body interferes with the working area W (active safety feature). According to a first embodiment of the invention, the automated line comprises, below counter top 2 and inside a frame 13, an ice machine 5, a liquid base ingredient stock 6, a solid base ingredient stock 7, a soda fountain 8, a glass dispenser 9, pumps 10, dirty water tanks 11, clean water tank 12.

Figure 4:
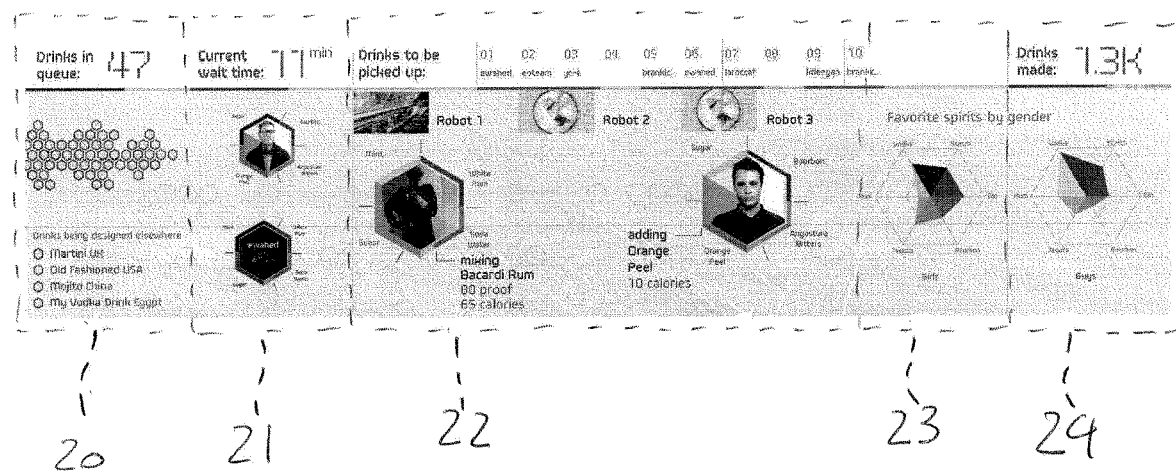
FIG. 4 is a schematic view of a display of the platform of FIG. 1.

The automated line also comprises the visual media 104 to display a virtual aesthetic representation of the process. The visual media is to display:
- Users signing in the user interface frontend software (indicated with numeral 20 in FIG. 4);
- Users composing their drinks 106 through user interface frontend software (indicated with numeral 20);
- Users confirming their order user interface frontend software (indicated with numeral 20);
- Queuing process of the people who confirmed the user interface frontend software (indicated with numeral 20);
- Drink building process representation including wait time (indicated with numeral 21);
- Show the ingredients being poured by the automated machinery (indicated with numeral 22);
- Display statistics related to the preparation and the most-wanted cocktails (indicated with numerals 23, 24).

The workflow first thing foresees the generation of a series of data by means of the interaction between people and the user interface frontend software. Users register themselves into the user interface frontend software, and get access to: a list of base ingredient, a list of mix of ingredients (recipes) pre-selected by the programmer, and a list of mix of ingredients pre-selected by previous users. Following one of these three paths a user can post his/her request into the system.

These information are transmitted to the Backend software that post-processes them in order to make them readable by the automated machinery 105. The automated machinery 105 receives the queuing list of orders, and performs, in order: glass dispensing, ingredient dispensing according to base ingredient mix, ingredients collection by the end effector performed by gravity, drink preparation by means of shaking, blending, muddling or stirring, drink delivery by means of conveyor belt 4.

Figure 5:
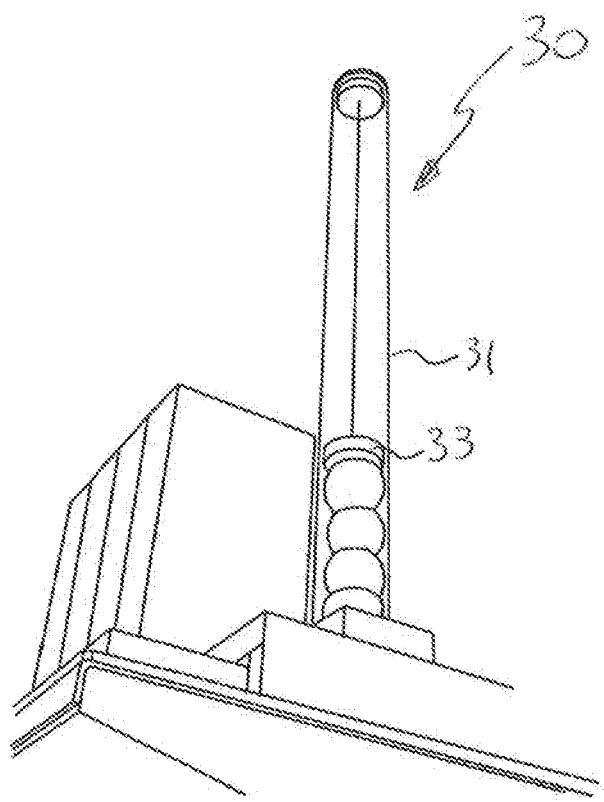
FIGS. 5 and 6 are perspective views of respective details of a sub-unit of the robotic station of FIG. 2.
Figure 6:
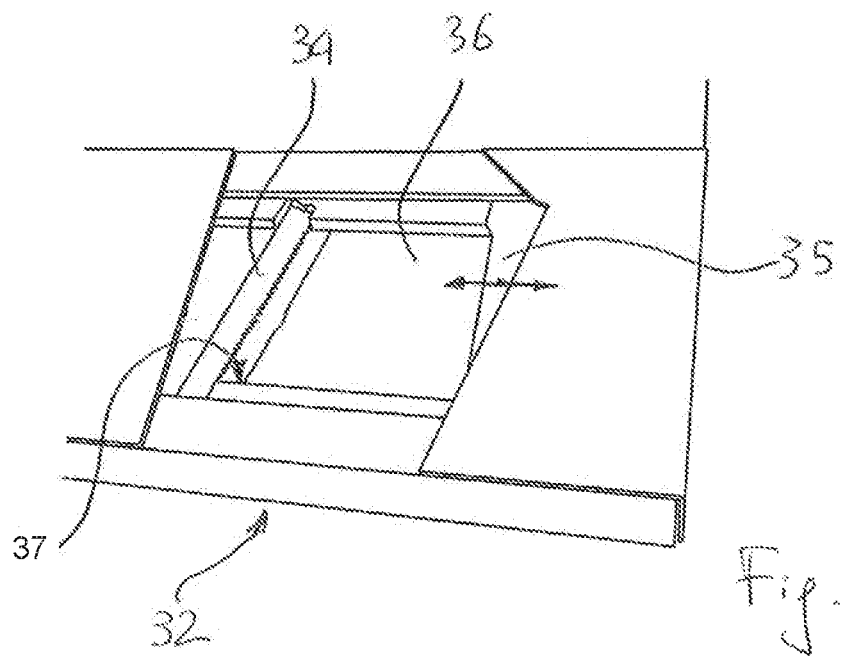

FIGS. 5 and 6 show an example of an automated dispenser 30 for preparing fresh slices of fruits used as ingredient in drink recipes, in particular fresh lemon slices. In particular, dispenser 30 comprises a bin 31 to collect the fruit and a cutting base 32 below bin 30. Fruits inside bin 31 are pressed on the cutting base 32 by gravity and, if the case, a weight is added to press fruits on the cutting base 32. Other pressure means can substitute weight 32.

Cutting base 32 has a blade 34 and a plunger 35 controlled by the backend software to cut a fresh fruit slice when instructed. The slice is collected by end effector 14 by gravity. In particular, cutting base 32 comprises a bottom wall 36 to retain fruits inside bin 31 and plunger 35 pushes the fruit contacting bottom wall 36 in order to cut the slice and expel the latter through a bottom slot 37 delimited by blade 34.

FIGS. 7 and 8 show a further layout embodiment of the present invention which is identical to embodiment of FIGS. 1 to 6 except for what follows. Automated line 40 comprises automated dispensers 2 and robotic arm switched dispenser 41. In particular, automated dispensers 2 are controlled by the backend software and robotic arm switched dispensers 41 are opened by contact with robotic arms 1 when end effector 14 is placed in a suitable position for ingredient collection. Preferably also dispenser 41 is by gravity and comprises a plurality of containers, in particular bottles, 42 and a plurality of respective holders 43 to hold bottles 42 upside down. Preferably dispenser 41 is above counter top 3 and defines a window A1 through which the user sees robots 1 preparing drinks 106 when standing in front of counter top 2 (FIG. 7).

In particular, each bottle 42 is connected to a metering shutter 44 delivering a fixed and predefined quantity of an ingredient by gravity when switched. Metering shutter 44 is opened in a discrete or on-off manner and preferably comprises a lever 45 or the like that shall be pressed or tilted or the like to deliver the fixed and predefined quantity of the ingredient. Robotic arms 1 appropriately contact and switch a relevant metering shutter 44 so that end effector 14 collects by gravity the ingredient, e.g. a liquid. An ingredient amount with the drink recipe is an integer multiple of the fixed and predefined quantity so that the robots 1 may need more than one switch of metering shutter 44 to collect the correct amount for the recipe.

FIG. 10 discloses in greater detail holder 43. Holder 43 releasably supports a bottle or container 42 upside-down. A stirrup 46 is fixed above counter top 3 and a releasable arm 47 is attachable to bottle 42 and connectable to bracket 46. Preferably releasable arm 47 is connected to a respective metering shutter 44.

Releasable connection between releasable arm 47 and bracket 46 can be of any kind and preferably includes a threaded pin 48 or a quick connector.

Figure 11:
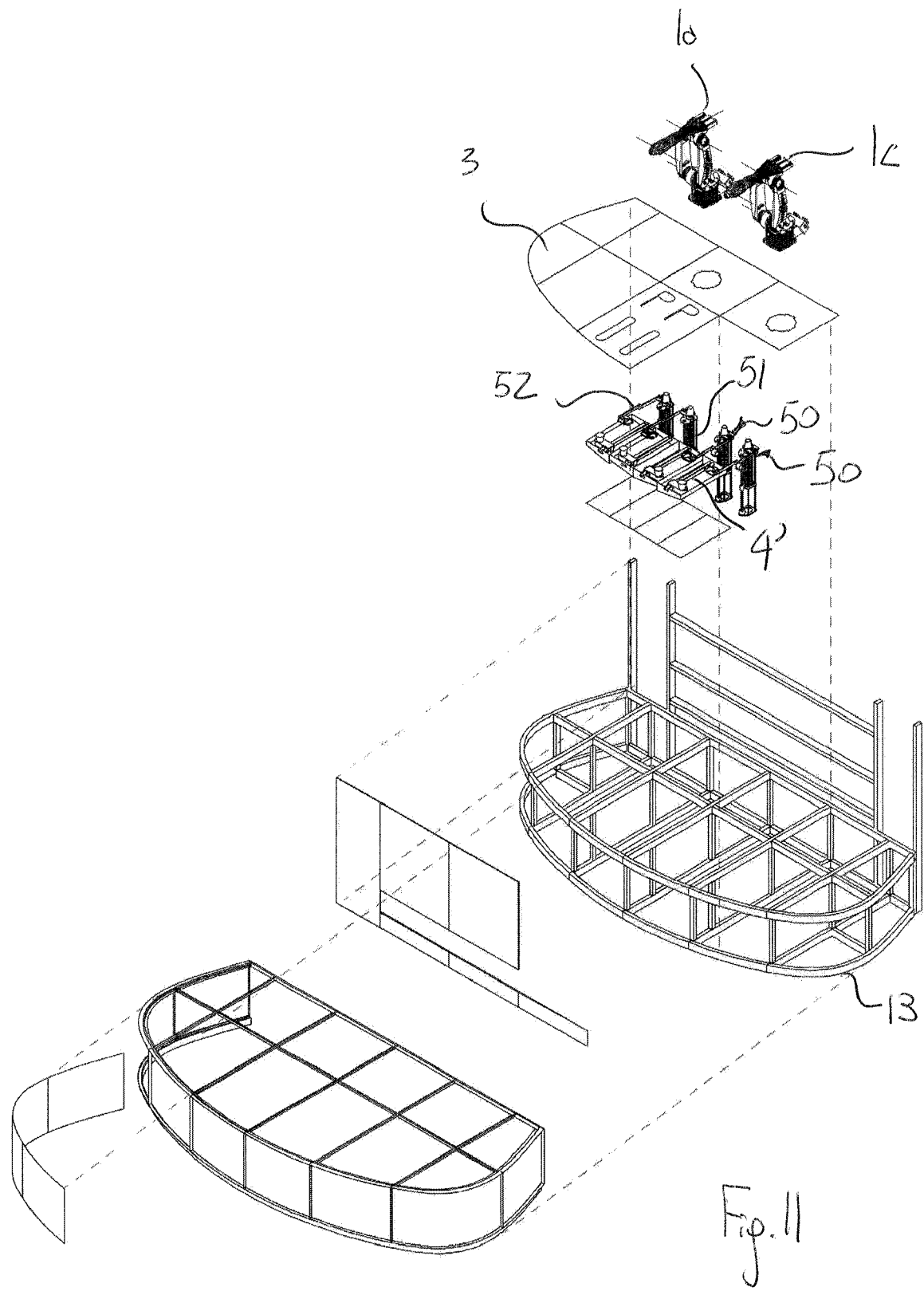
FIG. 11 is an exploded view of a robotic station according to a third embodiment of the present invention.

Automated line 40 also comprises a cup or glass dispenser to place glass 15 on a conveyor 4'. Dispenser 50 comprises a rack 51 to pile-up glasses and a tilting rigid arm 52. Preferably dispenser 50 is below counter top 3 (FIG. 11).

Figure 12:
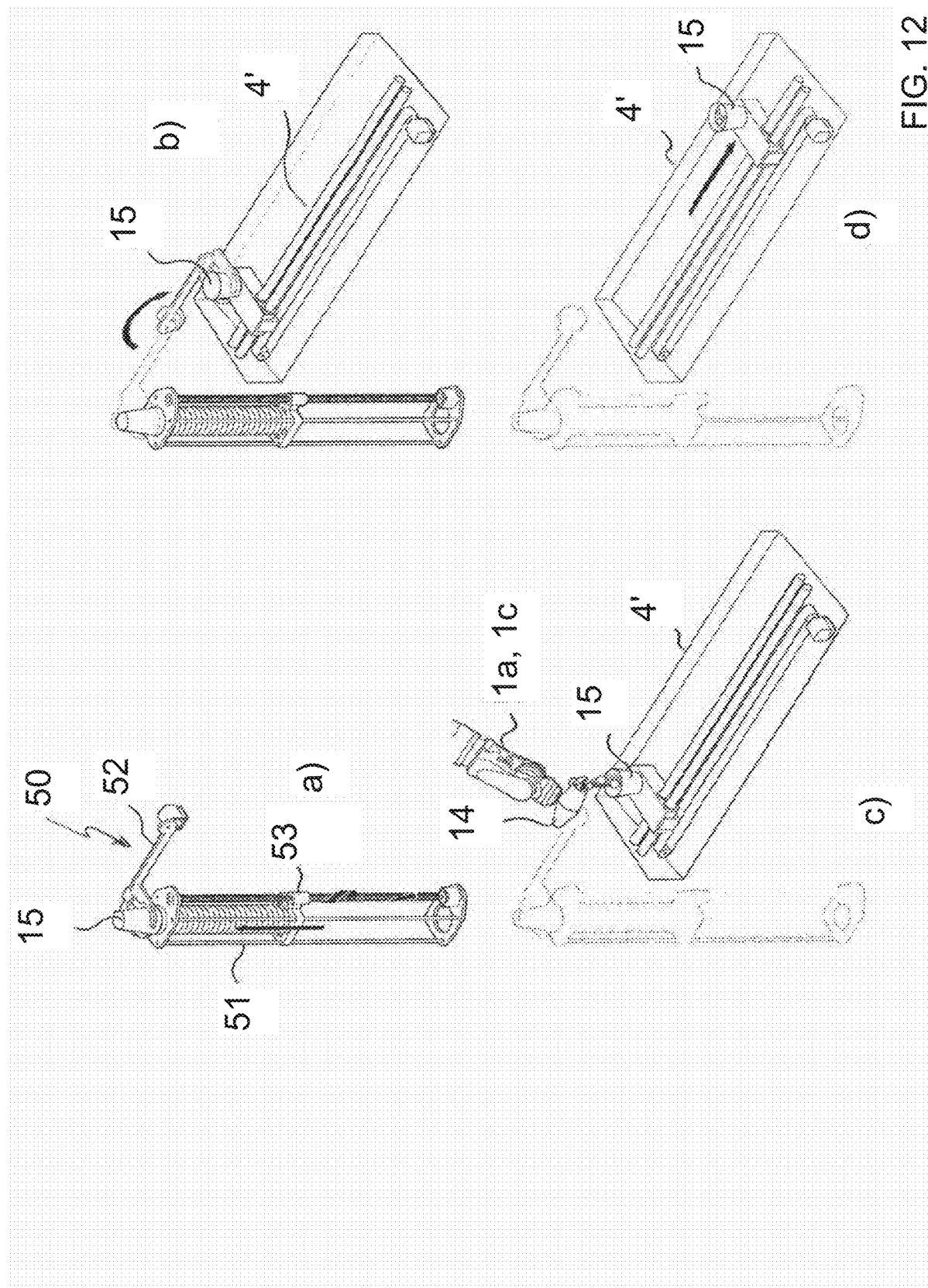
FIG. 12 is a sequence of schematic perspective views of a sub-unit of the robotic station according to the present invention.

Dispenser 50 works as follows (FIG. 12 from details 'a' to 'd'). Arm 52 in controlled by backend software to pick an empty glass 15 from rack 51; Arm 52 tilts or moves so as to place empty glass 15 on conveyor 4' ready to receive a cocktail; Robotic arm 1a, 1c pours the drink from end effector 14 to glass 15 and conveyor 4' delivers the drink in glass 15 to the user. Preferably, rack 51 comprises a moving platform 53 to keep empty glass 15 to be picked by arm 52 at a substantially constant level so that arm 52 moves in a discrete manner between a pick-up position to grab an empty glass 15 from rack 51 (FIG. 12a) and a release position to place the empty glass 15 on conveyor 4' (FIG. 12b). In order to avoid possible interferences with robotic arms 1a, 1c, arm 52 returns back from the release position to the grab position before the drink is poured from end effector 14 into glass 15 (FIG. 13). As an alternative, a cup or glass dispenser is such to provide, e.g. by gravity, a glass in the upright position illustrated e.g. in FIG. 12*b* and the robotic arm moves the cup from the dispenser into a filling area and, afterwards, pours the drink inside the cup.

According to a further preferred embodiment, automated line 40 comprises an automated gate 60 to control the pick-up of glass 15 when filled by drink prepared by robotic arms 1*a*, 1*c*. In particular, gate 60 is controlled by the backend software which recognizes that the ordered drink is ready on conveyor 4' and releases gate 60 when the user provides an identification that he/she ordered that drink.

Preferably gate 60 comprises an opening door 61 as shown in FIG. 9 that defines the access to the drink.

Alternatively gate 60 comprises a door 62 fitted on conveyor 4' and is movable together with glass 15 (FIG. 14). According to a preferred embodiment, door 62 defines a moving receptacle that is open when glass 15 receives the drink from end effector 14; is closed around glass 15 to avoid accidental pick-up; moves along with glass 15 on conveyor 4' and is opened when the backend software recognizes a release code owned by the user who made the order. Preferably the release code is transmitted wirelessly by a portable device to a sensor 63 controlled by the backend software (FIGS. 14*a* to 14*d*).

Figure 15:
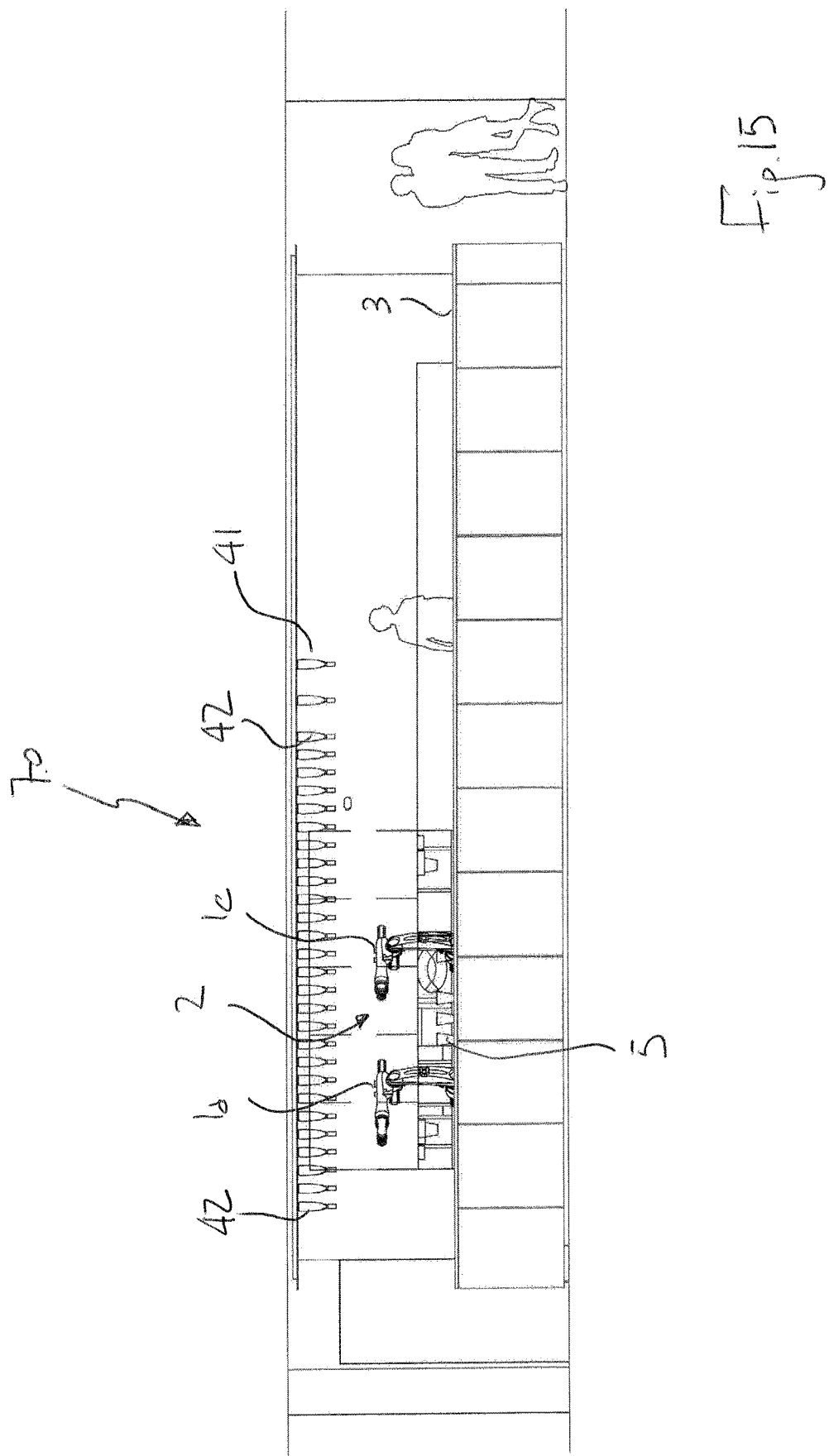

FIG. 15 disclose a further layout of an interactive robotic station according to the present invention. Interactive robotic station 70 is identical to station 40 unless where explicitly mentioned. In particular, interactive robotic station 70 has a counter top 3 layout to provide a structural barrier to avoid injuries from direct contact of robots 1 and a user. In particular, the longitudinal (FIG. 15) and transversal (FIG. 16) dimensions of counter top 3 are set so that a user stays outside the area defined by the maximum elongation or extension of robots 1, even in case of malfunctioning. Such structural barrier is an alternative or can be combined to the optical barrier defined by scanners 19.

FIGS. 17 to 19 disclose a further layout of an interactive robotic station according to the present invention. Interactive robotic station 80 is identical to robotic station of FIG. 2 and the layout of components changes. Numerals used in the past paragraphs are also shown in FIGS. 17 to 19 to designate corresponding element.

Furthermore, it is possible that the software described above be used with robotic stations not comprising anthropomorphic robots. Even further, the software comprising a downloadable application that can be installed on a personal computer or a personal intelligent mobile device, can be used to share recipes on social networks. Furthermore, the application can store and display to the respective users information about their preparations or recipes and/or orders. This is for example in line with a recent trend to store information about personal daily life/lifestyle (e.g. quantified self).

Furthermore, the application can calculate the amount of alcohol and/or of calories for each user depending on the relative past preparations or recipes and/or orders.

The invention claimed is:

1. An interactive beverage preparation station comprising:
    a user input interface for receiving inputs of a beverage order by a user;
    a robotic station comprising at least one robotic arm having an end effector comprising a collection container having a closed bottom end and an open top end, wherein the robotic station is configured to:
        collect ingredients in the collection container on the basis of the beverage order;
        mix the ingredients in the collection container to form a beverage; and
        pour the beverage from the collection container into a drinking container;
    a pick-up zone where the user receives the drinking container from the robotic station;
    a control unit operably coupled to the robotic station to automatically control the robotic station based on the inputs received by the user input interface to prepare the beverage correspondent to the beverage order;
    wherein the robotic station performs bartending operations within the collection container including shaking and at least one of muddling, blending, and straining; and
    wherein the end effector comprises an actuated cap controlled by the control unit for automatically opening the open top end of the collection container when the robotic station is collecting ingredients in the collection container and pouring the beverage from the collection container into the drinking container and automatically closing the open top end of the collection container in a waterproof manner when the robotic station is mixing the ingredients in the collection container.

2. The preparation station according to claim 1, further comprising automated beverage ingredient dispensers controlled by the control unit and robotic arm beverage ingredient dispensers switched by a contact motion of the robotic arm when holding the end effector to collect an ingredient.

3. The preparation station according to claim 2, wherein the control unit stores a spatial position of a collection point associated to each dispenser in order to place the end effector in a collection point during collection of beverage ingredients.

4. The preparation station according to claim 2, wherein the automated beverage ingredient dispensers and/or the robotic arm beverage ingredient dispensers comprise an ingredient dosimeter to dispense a predefined and fixed quantity of an ingredient when switched.

5. The preparation station according to claim 2, wherein the robotic arm beverage ingredient dispensers are such to dispense an ingredient by gravity.

6. The preparation station according to claim 1, wherein the robotic arm is controlled to move in a predefined and wavy motion for at least one of the following operations: shaking or stirring.

7. The preparation station according to claim 1, further comprising a gate to prevent a user from grasping the drinking container after preparation and in that the control unit releases the gate when receiving a code from the user so that the user can pick-up the drinking container.

8. The preparation station according to claim 1, further comprising a further arm to grab an empty cup and place the empty cup in a loading station where the robotic arm fills the empty cup and wherein the robotic arm is an anthropomorphic arm.

9. The preparation station according to claim 1, wherein the actuated cap of the end effector is configured to pivot relative to the collection container between an open state for collecting the ingredients and pouring the beverage into the drinking container and a closed state for performing the mixing.

10. The preparation station according to claim 1 wherein, in response to receiving instructions from the control unit, the at least one robotic arm is configured to move according to a predefined wavy motion that represents a choreographed dance.

11. The preparation station according to claim 1 wherein the end effector further comprises a filter cap operably coupled to the control unit, and wherein prior to pouring the beverage from the collection container into the drinking container the control unit alters the filter cap into a closed state in which the filter cap at least partially covers the open top end of the collection container so that the beverage is strained through the filter cap as it is poured from the collection container into the drinking container.

12. The preparation station according to claim 1 wherein the end effector further comprises a filter cap operably coupled to the control unit, and wherein the robotic station is configured to:
  collect ingredients in the collection container on the basis of the beverage order with the actuated cap and the filter cap in an open state;
  alter the actuated cap from the open state to a closed state such that the actuated cap closes the open top end of the collection container in the waterproof manner;
  shake the collection container to mix the ingredients in the collection container to form the beverage;
  alter the actuated cap from the closed state to the open state;
  alter the filter cap from the open state to a closed state so that the filter cap at least partially closes the open top end of the collection container; and
  pour the beverage from the collection container into the drinking container while the filter cap is in the closed state so that the beverage is strained through the filter cap.

13. The preparation station according to claim 1 wherein the robotic arm is coupled to a horizontal support surface of the preparation station.

14. The preparation station according to claim 13 wherein the horizontal support surface is a countertop.

15. The interactive beverage preparation station according to claim 1 further comprising an additional robotic arm positioned adjacent to the at least one robotic arm, the additional robotic arm configured to hold the drinking container while the at least one robotic arm pours the beverage from the collection container into the drinking container, and wherein the additional robotic arm arranges for the drinking container with the beverage therein to be placed into the pick-up zone.

16. The interactive beverage preparation station according to claim 1 further comprising an electronic optical device to delimit a working area within which the at least one robotic arm can freely move.

17. The preparation station according to claim 16, wherein the electronic optical device comprises a sensor that is operably coupled to the control unit, and wherein the control unit is configured to stop movement of the robotic arm if a body is detected by the sensor within the working area.

18. The preparation station according to claim 16, wherein the electronic optical device comprises a 2D laser scanner.

19. The preparation station according to claim 16, further comprising a conveyor to load the drinking container after preparation and defining the pick-up zone distal from the robotic arm.

20. An interactive beverage preparation station comprising:
  a user input interface for receiving inputs of a beverage order by a user;
  a robotic station comprising at least one robotic arm having an end effector comprising a collection container having a closed bottom end and an open top end, an actuated cap, and a filter cap, wherein the robotic station is configured to: (1) collect ingredients in the collection container on the basis of the beverage order with the actuated cap and the filter cap in an open state; (2) alter the actuated cap from the open state to a closed state such that the actuated cap closes the open top end of the collection container; (3) shake the collection container to mix the ingredients in the collection container to form a beverage; (4) alter the actuated cap from the closed state to the open state; (5) alter the filter cap from the open state to a closed state; and (6) pour the beverage from the collection container into a drinking container such that the beverage is strained through the filter cap;
  a pick-up zone where the user receives the drinking container from the robotic station; and
  a control unit to automatically control the robotic station based on the inputs received by the input interface to prepare the beverage correspondent to the beverage order; and
  wherein altering the actuated cap and the filter cap between the open and closed states is controlled by the control unit.

* * * * *